(12) United States Patent
Lee

(10) Patent No.: US 12,682,699 B2
(45) Date of Patent: Jul. 14, 2026

(54) APPARATUS AND METHOD FOR DIAGNOSING FAILURE OF MICROPHONE OF VEHICLE

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 227 days.

(21) Appl. No.: 18/350,018

(22) Filed: Jul. 11, 2023

(65) Prior Publication Data

US 2024/0021030 A1     Jan. 18, 2024

(30) Foreign Application Priority Data

Jul. 12, 2022     (KR) ........................ 10-2022-0085954

(51) Int. Cl.
| | |
|---|---|
| *G07C 5/08* | (2006.01) |
| *G06N 3/0442* | (2023.01) |
| *G10K 11/178* | (2006.01) |

(52) U.S. Cl.
CPC ......... *G07C 5/0808* (2013.01); *G06N 3/0442* (2023.01); *G07C 5/0816* (2013.01);
(Continued)

(58) Field of Classification Search
CPC .. G07C 5/0808; G07C 5/0816; G06N 3/0442; G06N 3/045; G06N 3/09;
(Continued)

(56) References Cited

U.S. PATENT DOCUMENTS

| | | | |
|---|---|---|---|
| 2005/0190929 A1* | 9/2005 | Sporer | ..................... H04R 3/02 |
| 2006/0210091 A1* | 9/2006 | Okumura | ................. H04R 3/02 |

(Continued)

FOREIGN PATENT DOCUMENTS

| | | | |
|---|---|---|---|
| DE | 102017220466 B3 * | 1/2019 | |
| DE | 102018222825 A1 * | 6/2020 | |

(Continued)

OTHER PUBLICATIONS

Machine Translation of DE102017220466; "Method for Checking the Operability of at Least One Component of a Motor Vehicle and Motor Vehicle" (Year: 2019).*

(Continued)

*Primary Examiner* — Ellis B. Ramirez
(74) *Attorney, Agent, or Firm* — NovoTechIP International PLLC

(57)     ABSTRACT

An apparatus and method for diagnosing a microphone of a vehicle reduce an interior noise by applying an active road surface noise reduction method, learn sounds collected using a plurality of microphones to generate a simulated signal for a specific microphone, and detect a failure of the specific microphone by comparing the simulated signal with an actually measured sound of the specific microphone so that noise reduction efficiency can be improved by distinguishing a noise from an interior sound, a failed microphone can be accurately detected using the sounds of the plurality of microphones, the spread of an unnecessary noise can be prevented by diagnosing a failure of the specific microphone, and a more comfortable and stable interior environment can be provided to occupants.

20 Claims, 7 Drawing Sheets

(52) U.S. Cl.
CPC .................. *G10K 11/17823* (2018.01); *G10K 2210/1082* (2013.01); *G10K 2210/1282* (2013.01)

(58) Field of Classification Search
CPC ....... G10K 11/17823; G10K 11/17833; G10K 11/1785; G10K 2210/1082; G10K 2210/1282; G10K 2210/12821; G10K 2210/501; G10K 2210/503; H04R 29/005; B60R 16/023; G05B 23/0235; G05B 23/027
USPC ............... 701/29.1; 381/71.4, 58, 71.6, 122; 455/67.11
See application file for complete search history.

(56) References Cited

U.S. PATENT DOCUMENTS

| | | | | |
|---|---|---|---|---|
| 2009/0279710 | A1* | 11/2009 | Onishi | ............. G10K 11/17883 |
| 2016/0071508 | A1* | 3/2016 | Wurm | ............. G10K 11/17817 |
| 2019/0139531 | A1* | 5/2019 | Kim | ................. G10K 11/17879 |
| 2019/0378401 | A1* | 12/2019 | Layton | ................. G08B 29/126 |
| 2020/0359146 | A1* | 11/2020 | Klinke | ................. H04R 29/004 |
| 2021/0144497 | A1* | 5/2021 | Lee | .......................... G10L 25/51 |
| 2021/0352423 | A1* | 11/2021 | Gustafsson | ............ H04R 29/00 |
| 2022/0277721 | A1* | 9/2022 | Zhang | ................. G10L 21/0208 |

FOREIGN PATENT DOCUMENTS

| | | | | | |
|---|---|---|---|---|---|
| DE | 102019204209 | A1 | * | 10/2020 | ........... H04R 29/004 |
| KR | 20100112847 | A | * | 10/2010 | |
| KR | 20110087109 | A | * | 8/2011 | |
| KR | 10-2022-0078212 | A | | 6/2022 | |

OTHER PUBLICATIONS

Machine Translation of German Application DE-102019204209-A1 (Schoenrock) (Year: 2020).*

* cited by examiner

<u>1</u>

APPARATUS AND METHOD FOR DIAGNOSING FAILURE OF MICROPHONE OF VEHICLE

CROSS-REFERENCE TO RELATED APPLICATIONS

This application claims priority from and the benefit of Korean Patent Application No 10-2022-0085954, filed on Jul. 12, 2022, which is hereby incorporated by reference for all purposes as if set forth herein.

TECHNICAL FIELD

Exemplary embodiments of the present disclosure relate to an apparatus and method for diagnosing a microphone of a vehicle and detecting a failure of the microphone by simulating a sound of a specific microphone using a sound input through a plurality of microphones while reducing a noise of the vehicle and comparing the simulated sound with an actual sound of the microphone.

BACKGROUND

Vehicles generate noises due to the driving of engines as well as road surface noises due to the contact of the vehicles with road surfaces while traveling on roads. Occupants hear a combined noise of a noise of a vehicle itself and a road surface noise as an interior noise while riding in an interior of the vehicle.

As a method of reducing such an interior noise, a sound absorbing material or a soundproofing material is installed in a vehicle body to reduce the interior noise.

However, when the existing sound absorbing material or soundproofing material is used, there is a problem in that a weight of the vehicle increases, and even when the existing sound absorbing material or soundproofing material is used, there is a limit to blocking a noise.

Recently, in order to reduce an interior noise generated during traveling, application of a function of reducing a road surface noise, which is generated when tires come into contact with a road surface, to vehicles is on the rise.

Generally, road noise active noise control (RANC) is used to reduce a road surface noise.

The RANC is a control method of measuring a vibration transmitted from a road surface to a vehicle using an acceleration sensor, analyzing the type and size of a noise input through a microphone, and blocking the noise using canceling sound waves.

Generally, it takes about 9 ms for a road surface noise to reach occupants, and the RANC reduces an interior noise by generating canceling sound waves before the road surface noise reaches the occupants.

Therefore, when compared to a method of using the existing sound absorbing material or soundproofing material, it is possible to effectively reduce a noise without increasing a weight of a vehicle body.

In particular, since an electric vehicle generates no engine noise, an interior noise is reduced, but a road surface noise is relatively prominent, so measures for effectively reducing a road surface noise are needed.

As a related technology, there is Korean Patent Laid-Open Application No. 10-2022-0078212, entitled "Active noise control apparatus and method of controlling the same."

In the active road surface noise reduction method, an indoor noise level is measured using a microphone by outputting opposite-phase sound waves through a speaker according to a value of an acceleration sensor installed in a vehicle. That is, since the active road surface noise reduction method uses a closed loop control system in which a speaker output signal is varied according to a microphone signal, when luggage loaded in the vehicle bumps into a microphone, and when a contact failure occurs or a noise is directly applied due to aging of the microphone, a divergence phenomenon in which the speaker signal increases a vehicle noise instead of reducing the vehicle noise may occur.

In addition, when a single microphone is used and a failure is determined based on a sound level, there is a problem of determining even a vehicle vibration measurable by an acceleration sensor, a conversation sound of occupants, a guidance voice of a navigation system, and a played music as noises when the microphone signal is used.

Therefore, measures are necessary to effectively remove a road surface noise and diagnose a failure of a microphone while excluding a conversation sound of occupants, a voice guidance, and a music sound.

SUMMARY

Various embodiments are directed to solving the above described problems, and an object according to one aspect of the present invention is to provide an apparatus and method for diagnosing a microphone of a vehicle that reduce an interior noise through application of an active road surface noise reduction method and simulate a sound of a specific microphone using a plurality of microphones to diagnose a failure of the specific microphone.

In an embodiment, an apparatus for diagnosing a microphone of a vehicle according to an aspect of the present invention includes a plurality of microphones, a plurality of speakers, a digital signal processor (DSP) configured to process sounds input from the plurality of microphones into digital signals, and a processor configured to generate a simulated signal for a first microphone using signals of the remaining microphones, excluding the first microphone, among the plurality of microphones, compare an actually measured signal of the first microphone with the simulated signal to calculate a loss value, and detect a failure of the first microphone according to the calculated loss value.

When the loss value of the simulated signal of the first microphone exceeds a preset threshold value, the processor may diagnose the first microphone as failing.

The processor may generate the simulated signal of the first microphone, compare the actually measured signal of the first microphone through a loss function to calculate the loss value, add a predetermined margin to a maximum value among a plurality of loss values calculated through a learning process of optimizing the loss value, and set the threshold value for the first microphone.

The processor may generate simulated signals for a plurality of sounds input from the plurality of microphones using a long short-term memory (LSTM) auto encoder.

The LSTM auto encoder may include an LSTM encoder and an LSTM decoder, and the LSTM encoder may extract and abstract a feature of a signal, and the LSTM decoder may restore and actualize the signal.

The processor may optimize the loss value by feeding back a network weight to the LSTM auto encoder using stochastic gradient descent based on the loss value for the simulated signal of the first microphone.

When at least one among the plurality of microphones fails, the processor may stop a noise reduction operation and output a warning for the failed microphone.

The processor may analyze sounds input through the plurality of microphones to classify types and amplitudes of the sounds, detect a road surface noise to generate an attenuation signal with a phase opposite to a phase of the road surface noise, and output the attenuation signal through the plurality of speakers to perform the noise reduction operation.

In an embodiment, a method of diagnosing a microphone of a vehicle according to another aspect of the present invention includes processing sounds input from a plurality of microphones into digital signals, generating a simulated signal for a first microphone using signals of the remaining microphones, excluding the first microphone among the plurality of microphones, comparing an actually measured signal of the first microphone with the simulated signal and calculating a loss value, and detecting a failure of the first microphone according to a magnitude of the loss value.

The detecting of the failure of the first microphone may include diagnosing the first microphone as failing when the loss value of the simulated signal of the first microphone exceeds a preset threshold value.

The generating of the simulated signal may include generating the simulated signal using signals of second to fourth microphones among the plurality of microphones.

The generating of the simulated signal may include generating the simulated signal of the first microphone based on the signals of the second to fourth microphones using a long short-term memory (LSTM) auto encoder.

The generating of the simulated signal may include extracting and abstracting features of signals through a plurality of LSTM encoders included in the LSTM auto encoder, and restoring and actualizing the signals through a plurality of LSTM decoders included in the LSTM auto encoder.

The method may further include generating the simulated signal of the first microphone, comparing the simulated signal of the first microphone with the actually measured signal of the first microphone through a loss function and calculating the loss value, optimizing the loss value by feeding back a network weight to the LSTM auto-encoder using stochastic gradient descent based on the loss value, performing learning by repeating the generating of the simulated signal to the optimizing of the loss value, and setting the threshold value for the first microphone by adding a predetermined margin to a maximum value among a plurality of calculated loss values.

The method may further include, when at least one among the plurality of microphones fails, stopping a noise reduction operation, and outputting a warning for the failed microphone.

DETAILED DESCRIPTION

Figure 1:
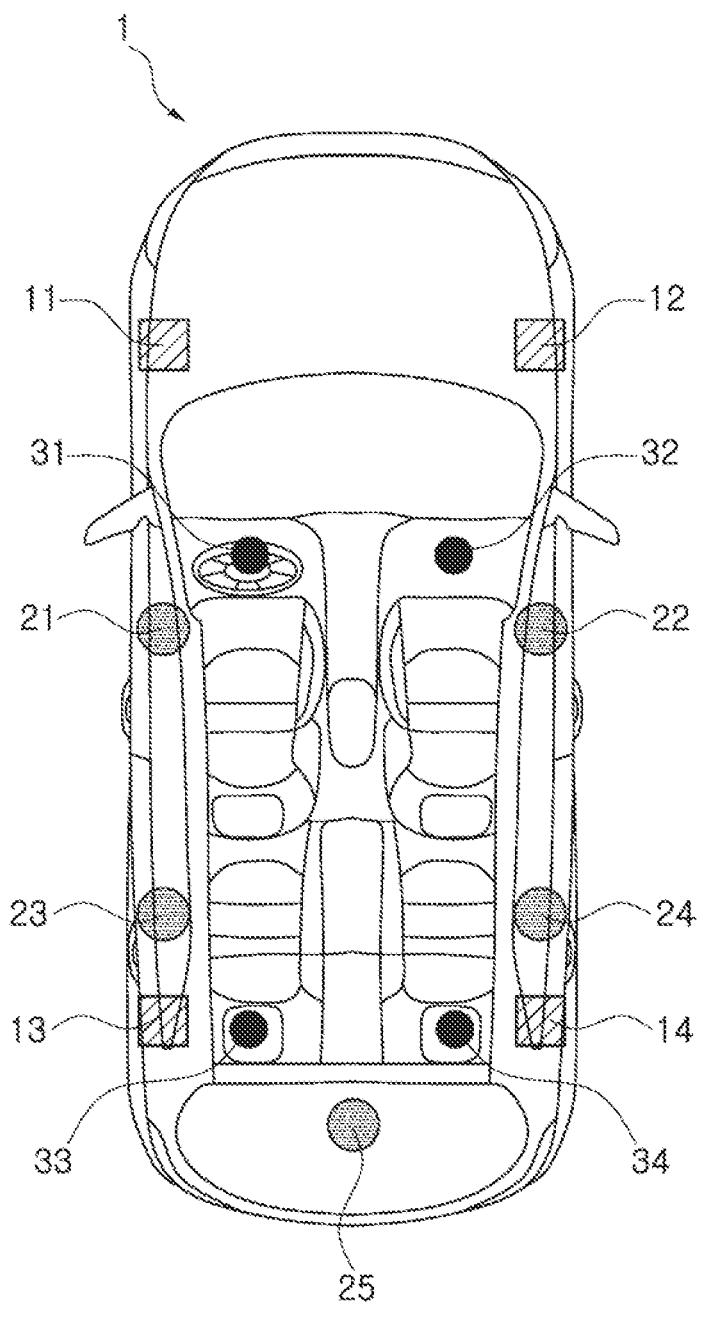
FIG. 1 is a diagram illustrating a configuration of a vehicle in which microphones and speakers are disposed according to one embodiment of the present invention.

Hereinafter, the present invention will be described with reference to the accompanying drawings.

Here, thicknesses of lines, sizes of constituent elements, or the like illustrated in the drawings, may be exaggerated for clarity and convenience of description. In addition, the terms used below are defined considering the functions in the present invention and may vary depending on the intention of a user or an operator or a usual practice. Therefore, such terms should be defined based on the entire contents of the present specification.

FIG. 1 is a diagram illustrating a configuration of a vehicle in which microphones and speakers are disposed according to one embodiment of the present invention.

As shown in FIG. 1, a plurality of acceleration sensors 41 to 44, a plurality of microphones 31 to 34, and a plurality of speakers 21 to 25 are installed in a vehicle 1. In addition, the vehicle 1 includes a processor (not shown) for controlling a vehicle and a digital signal processor (not shown) for converting a signal.

The plurality of acceleration sensors 41 to 44 are installed at the left and right of a front side and the left and right of a rear side, respectively, based on a wheel position of the vehicle 1.

The plurality of speakers 21 to 25 include a first speaker 21 installed at a left side of a driver seat, a second speaker 22 installed at a right side of a passenger seat, a third speaker 23 installed at a left side of a rear seat, a fourth speaker 24 installed at a right side of the rear seat, and a fifth speaker 25 installed at the center of a rear side of the rear seat.

The plurality of speakers 21 to 25 output a surround sound to an interior of the vehicle 1.

The plurality of speakers 21 to 25 output a music being played and a guidance voice of a navigation system.

The plurality of microphones 31 to 34 include a first microphone 31 installed at the center of a front side of the driver seat, a second microphone 32 installed at the center of a front side of the passenger seat, a third microphone 33 installed at the center of a rear side of a left rear seat, and a fourth microphone 34 installed at the center of a rear side of a right rear seat.

The first microphone 31 and the second microphone 32 are installed at the center of the front side based on the seat, and the third microphone 33 and the fourth microphone 34 are installed at the center of the rear side based on the seat adjacent to headrests.

The plurality of microphones 31 to 34 collect and transmit ambient sounds to the processor.

The plurality of microphones 31 to 34 receive a noise of an interior of the vehicle, a vehicle noise, and a road surface noise.

The processor compares signals input from the plurality of microphones 31 to 34 to detect an abnormal noise, determines a failure according to the abnormal noise, and outputs an error.

Figure 2:
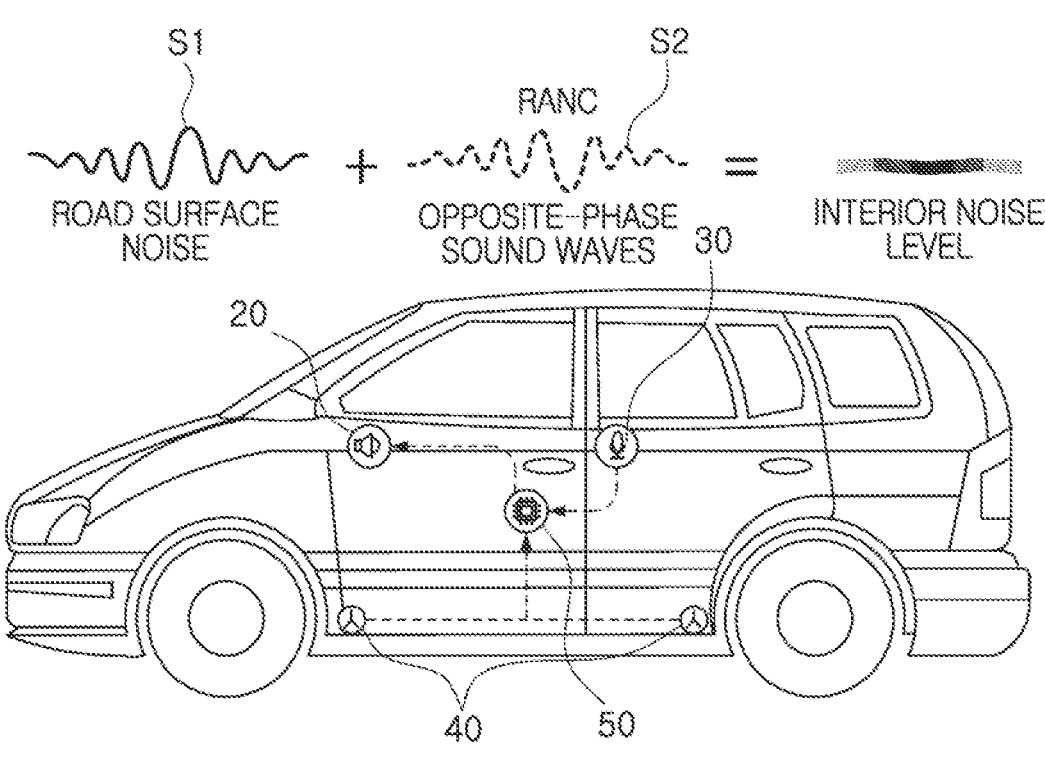
FIG. 2 is a diagram for describing a road surface noise reducing method of an apparatus for diagnosing a microphone of a vehicle according to one embodiment of the present invention.

FIG. 2 is a diagram for describing a road surface noise reducing method of an apparatus for diagnosing a microphone of a vehicle according to one embodiment of the present invention.

As shown in FIG. 2, microphones 30 collect and transmit ambient sounds to the processor.

The microphones 30 may collect different sounds according to installation locations, but since an interior area of the vehicle is small, a sound generated in the interior is transmitted to the plurality of microphones. Therefore, the plurality of microphones receive similar sounds except for a sound with a specific direction. However, a volume of the sound may be different according to the installation location of each microphone 30.

The acceleration sensor 40 detects vehicle acceleration and measures a vibration transmitted from the road surface to the vehicle 1.

The digital signal processor 50 receives and processes signals from the acceleration sensor 40 and the signal of the microphone 30. The digital signal processor 50 includes an analog digital converter (ADC) for converts an analog signal into a digital signal.

The digital signal processor 50 processes an input analog signal in real time. The digital signal processor 50 filters, samples, and analyzes the signals from the microphone 30 and the signal of the acceleration sensor 40 that are input in real time while the vehicle 1 is traveling and performs signal processing in real time.

The processor reduces road surface noise by applying road noise active noise control (RANC).

When the signals input from the microphone 30 and the acceleration sensor 40 are processed by the digital signal processor 50, the processor analyzes types and amplitudes of noises from signals input from the plurality of microphones 31 to 34 based on a vibration value of the acceleration sensor, distinguishes a road surface noise, generates a signal with a phase opposite to that of the road surface noise, and outputs the generated signal through the plurality of speakers 21 to 25, thereby attenuating the road surface noise to reduce an interior noise.

The processor outputs a signal corresponding to the noise of the microphone 30 through the speaker 20 to attenuate the noise, detects an abnormal noise, diagnoses a failure of the microphone 30, and controls the abnormal noise not to be output through the speaker 20.

Figure 3:
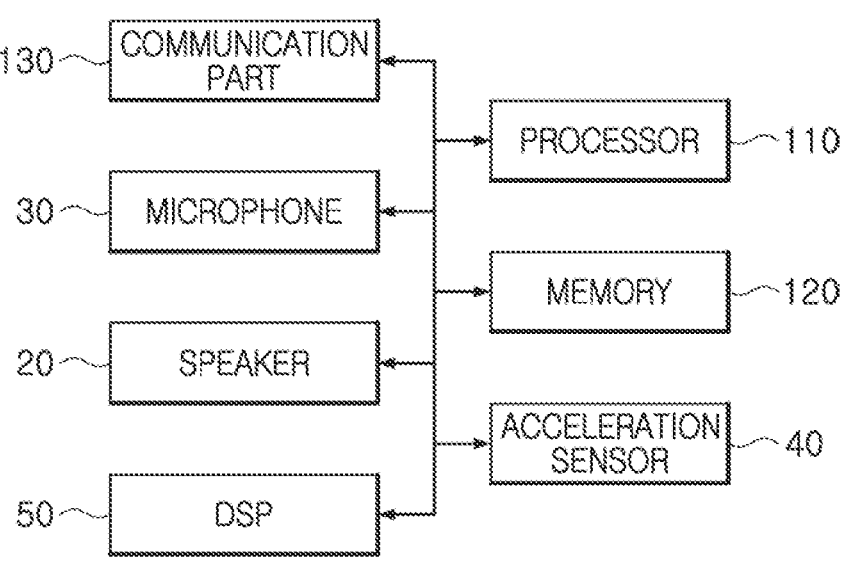
FIG. 3 is a block diagram illustrating a configuration of the apparatus for diagnosing a microphone of a vehicle according to one embodiment of the present invention.

FIG. 3 is a block diagram illustrating a configuration of the apparatus for diagnosing a microphone of a vehicle according to one embodiment of the present invention.

As shown in FIG. 3, the apparatus for diagnosing a microphone of a vehicle includes a communication part 130, the microphone 30, the acceleration sensor 40, the speaker 20, the digital signal processor 50, a memory 120, and a processor 110.

As described in FIG. 1, the microphone 30 is installed as a plurality of microphones in the vehicle to collect a sound. As described in FIG. 1, the speaker 20 is installed as a plurality of speakers in the vehicle to provide a surround sound. The acceleration sensor 40 is provided as a plurality of acceleration sensors to detect a vibration of the vehicle.

The communication part 130 includes a controller area network (CAN) communication module (a CAN driver) and transmits and receives data in the vehicle 1. The communication part 130 may include a wired or wireless communication module and may be connected to an external cloud server, other vehicle, or database.

The memory 120 classifies and stores a sound collected through the microphones 30 for each microphone and stores a simulated signal for each microphone and learning data for the simulated signal. In addition, the memory 120 stores a threshold value for each microphone set based on a loss value of the simulated signal of the microphone 30.

The memory 120 may include a random access memory (RAM), nonvolatile memories such as a read only memory (ROM) and electrically erased programmable ROM (EE-PROM), a flash memory, and a large-capacity storage medium such as a solid state drive (SSD).

The digital signal processor 50 receives and processes signals from the acceleration sensor 40 and the signal of the microphone 30.

The digital signal processor 50 filters, samples, and analyzes the signals from the microphone 30 and the signal of the acceleration sensor 40 that are input in real time while the vehicle 1 is traveling and performs signal processing in real time.

The digital signal processor 50 includes an ADC for converting an analog signal into a digital signal.

The processor 110 classifies a type and an amplitude of a sound and detects a road surface noise based on the signal processed by the digital signal processor 50. The processor 110 generates a signal with an opposite phase to attenuate the road surface noise and outputs the signal through the speaker 20 to reduce the road surface noise.

For example, the processor 110 reduces road surface noise by applying RANC.

In addition, the processor 110 generates a simulated signal for each microphone based on the signal processed by the digital signal processor 50 and learns a sound collected for each microphone to generate learning data.

The processor 110 simulates an input (sound) of a specific microphone using inputs of other microphones, compares the simulated input with an actually measured signal of the specific microphone, and determines that abnormality occurs when a difference therebetween is greater than a threshold value.

The processor 110 learns the sounds of the microphones using characteristics in which the sounds input through the microphone 30 have consistency based on a long short-term memory (LSTM) auto encoder and detects a failure based on the learned sounds.

The processor 110 learns the sounds of the microphones 30, sets a threshold value for each of the plurality of microphones, and detects a failure of the microphone based on the threshold value.

When the microphone fails, the processor 110 may stop a noise reduction operation of outputting an attenuation signal with an opposite phase through the speaker.

The processor 110 outputs a warning for a microphone in which a failure is detected among the plurality of microphones 31 to 34. The processor 110 may output a warning for a microphone failure in which a guide message, an icon, an image, a letter, and a number are combined through a display (not shown) of the vehicle and may output a warning sound through the speaker.

Figure 4:
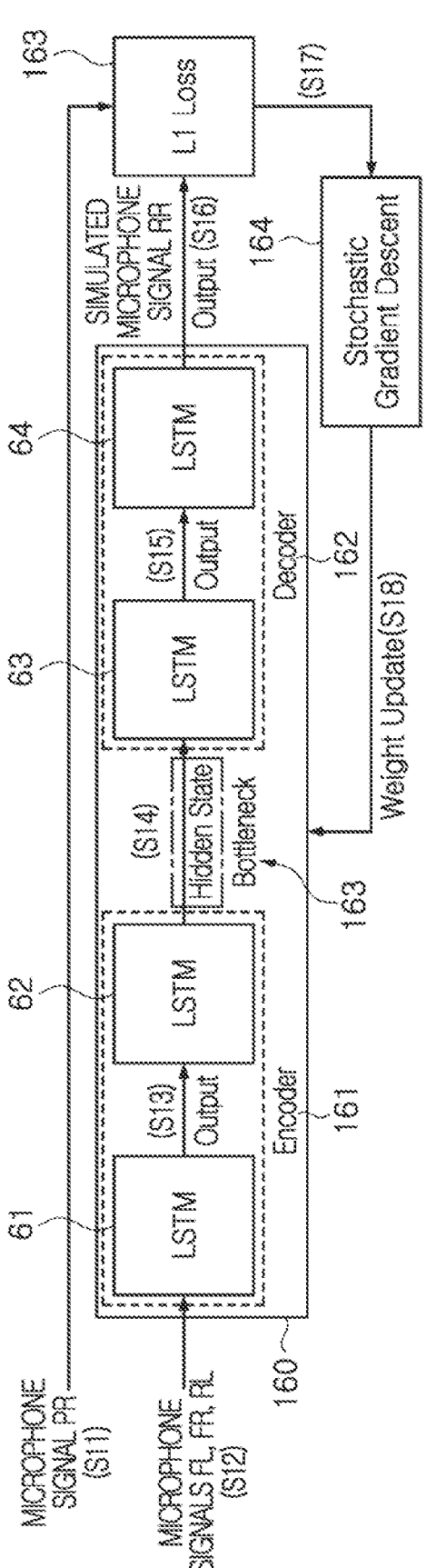
FIG. 4 is a diagram for describing a sound learning process of the apparatus for diagnosing a microphone of a vehicle according to one embodiment of the present invention.

FIG. 4 is a diagram for describing a sound learning process of the apparatus for diagnosing a microphone of a vehicle according to one embodiment of the present invention.

As shown in FIG. 4, the apparatus for diagnosing a microphone of a vehicle generates a simulated signal for each microphone 30 using an LSTM auto encoder 160.

The processor 110 generates a simulated signal for a specific microphone using a plurality of microphone signals.

For example, the processor 110 generates a simulated signal for the first microphone 31 using signals of the second microphone 32 to the fourth microphone 34 among the plurality of microphones. In addition, the processor 110 generates a simulated signal for the fourth microphone 34 (RR) using signals of the first microphone 31 (FL) to the fourth microphone 33 (RL).

The processor 110 generates the simulated signal for each of the first microphone 31 to the fourth microphone 34 and stores the simulated signal in the memory 120.

When the simulated signal for the fourth microphone 34 (RR) is generated, a signal S11 of the fourth microphone 34 (RR) is received, and signals S12 of the first microphone 31 (FL) to the third microphone 33 (RL) are input to an LSTM auto encoder 160.

The LSTM auto encoder 160 includes a first LSTM encoder 61, a second LSTM encoder 62, a first LSTM decoder 63, and a second LSTM decoder 64.

The first LSTM encoder 61 outputs a first output signal S13, and the second LSTM encoder 62 receives the first output signal and outputs a second output signal S14. The second output signal S14 is input to a LSTM decoder 162 via a predetermined section (Hidden State) 163.

The first LSTM decoder 63 outputs a third output signal S15, and the second LSTM decoder 64 outputs a fourth output signal S16. The fourth output signal S16 is the simulated signal of the fourth microphone 34 (RR).

By using a loss function L1 Loss 163, the processor 110 compares the simulated signal of the fourth microphone 34 (RR), which is the fourth output signal S16, with the previously input signal S11 of the fourth microphone 34 (RR) and calculates a loss value S17.

In addition, by using stochastic gradient descent 164, the processor 110 feeds back a network weight S18 to an input terminal of the LSTM decoder 162 and optimizes the loss value according to the feedback.

The processor 110 repeats the above process to perform learning for each of the first to fourth microphones 31 to 34, optimizes the loss value, and adds a predetermined margin to a maximum loss value to set a threshold value of each microphone. The threshold value of each microphone becomes a criterion for failure determination.

The processor 110 repeats the weight feedback, compares a loss value S27 of a loss function L1 loss 165 with the previously set threshold value, and terminates the learning process when the calculated loss value is smaller than the threshold value.

The processor 110 stores learning data and the threshold values in the memory 120.

This learning process is performed in a normal state with no noise in the microphone. Thus, the learning process is preferably performed at the manufacturing stage of the vehicle. In some cases, the learning data and the threshold values may be downloaded from a server or the like. In addition, learning data may be updated by repeating learning based on data collected during traveling.

Figure 5:
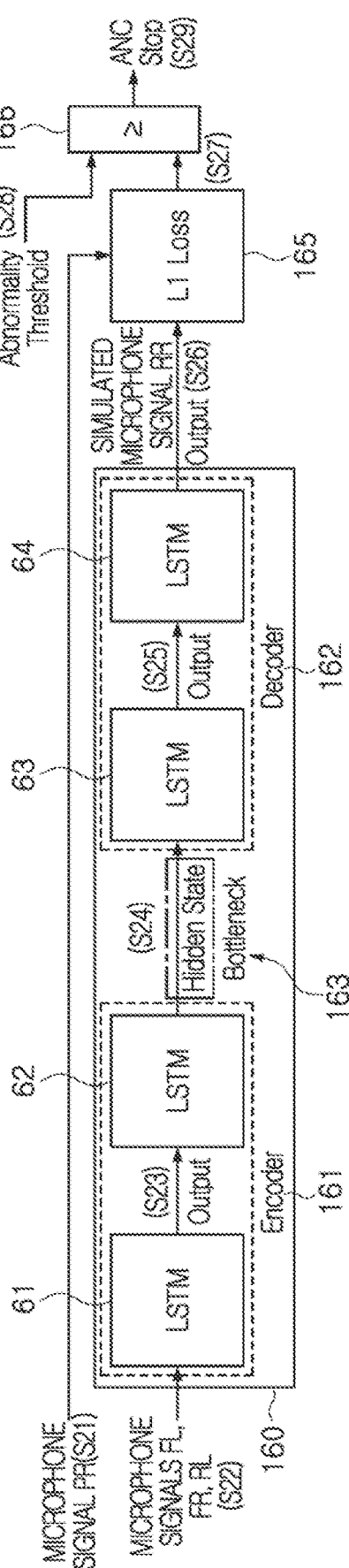
FIG. 5 is a diagram for describing a microphone failure diagnosing process using a sound of the apparatus for diagnosing a microphone of a vehicle according to one embodiment of the present invention.

FIG. 5 is a diagram for describing a microphone failure diagnosing process using a sound of the apparatus for diagnosing a microphone of a vehicle according to one embodiment of the present invention.

As shown in FIG. 5, the processor 110 deduces a simulated signal based on sounds of the plurality of microphones collected during traveling based on the learning data and detects a failure of the microphone.

In the same way as the learning process, the processor 110 analyzes a signal of the microphone using the LSTM auto encoder 160 and deduces a simulated signal.

The LSTM auto encoder 160 extracts and abstracts signal features in LSTM encoders 61 and 62 and reconstructs and specifies signals in the LSTM decoder 63 and 64.

The LSTM auto encoder 160 includes a first LSTM encoder 61, a second LSTM encoder 62, a first LSTM decoder 63, and a second LSTM decoder 64.

The processor 110 inputs a sound signal collected through the microphone 30 to the LSTM auto encoder 160.

A signal S21 of the fourth microphone 34 (RR) is received, and signals S22 of the first microphone 31 (FL) to the third microphone 33 (RL) are input to an LSTM auto encoder 160.

As described above, an output signal S24 of the LSTM encoder 161 is input to the LSTM decoder 162, and a signal S26 is outputs as a simulated signal for the fourth microphone 34 (RR).

By using a loss function L1 Loss 165, the processor 110 inputs the simulated signal S26 and the signal S21 of the fourth microphone 34 (RR) to output a loss value S27.

The processor 110 compares the loss value S27 of the loss function L1 loss (165) with a previously set threshold value S28 (S166), and when the calculated loss value is greater than the threshold value S28, the processor 110 determines as a failure.

When a failure is detected in a specific microphone, the processor 110 stops a noise reduction active noise canceling (ANC) function.

The processor 110 generates and outputs an error for a microphone failure.

Since the learning data is generated in a state with no noise, based on a noise measured during actual traveling, when abnormality occurs in a microphone, simulation accuracy is reduced.

When a failure occurs in any one among the plurality of microphones, and when a noise or the like is added to the specific microphone in which the failure occurs, the simulation accuracy is degraded, and thus the value of the loss function L1 loss (165) increases.

For example, when the signal RR of the fourth microphone 34 is simulated using the microphone signals FL, FR, and RL among the first microphone 31 to the fourth microphone 34, and when the third microphone 33 (RL) fails, accuracy of the simulated signal is reduced.

However, since the microphone signals FL and FR of the first and second microphones 31 and 32 are normal, assuming that influences on channels are the same, the accuracy of the simulated signal is lowered by about 30%.

On the other hand, when the fourth microphone for which a simulated signal is generated fails, since the signals FL, FR, RL of the first microphone 31 to the third microphone 33 are normal, the simulated signal is accurate, whereas the simulated signal of the fourth microphone 34 is not similar to an actually measured signal thereof so that the simulation accuracy becomes 0%.

The processor 110 may check whether each microphone is normal at each location using the threshold value for each microphone.

In addition, in the learning process using the LSTM auto encoder 160, when a data set using data with a noise applied to any one channel is assembled, simulation accuracy of a microphone signal may be improved even in a situation in which a signal of a failed microphone is input.

Figure 6:
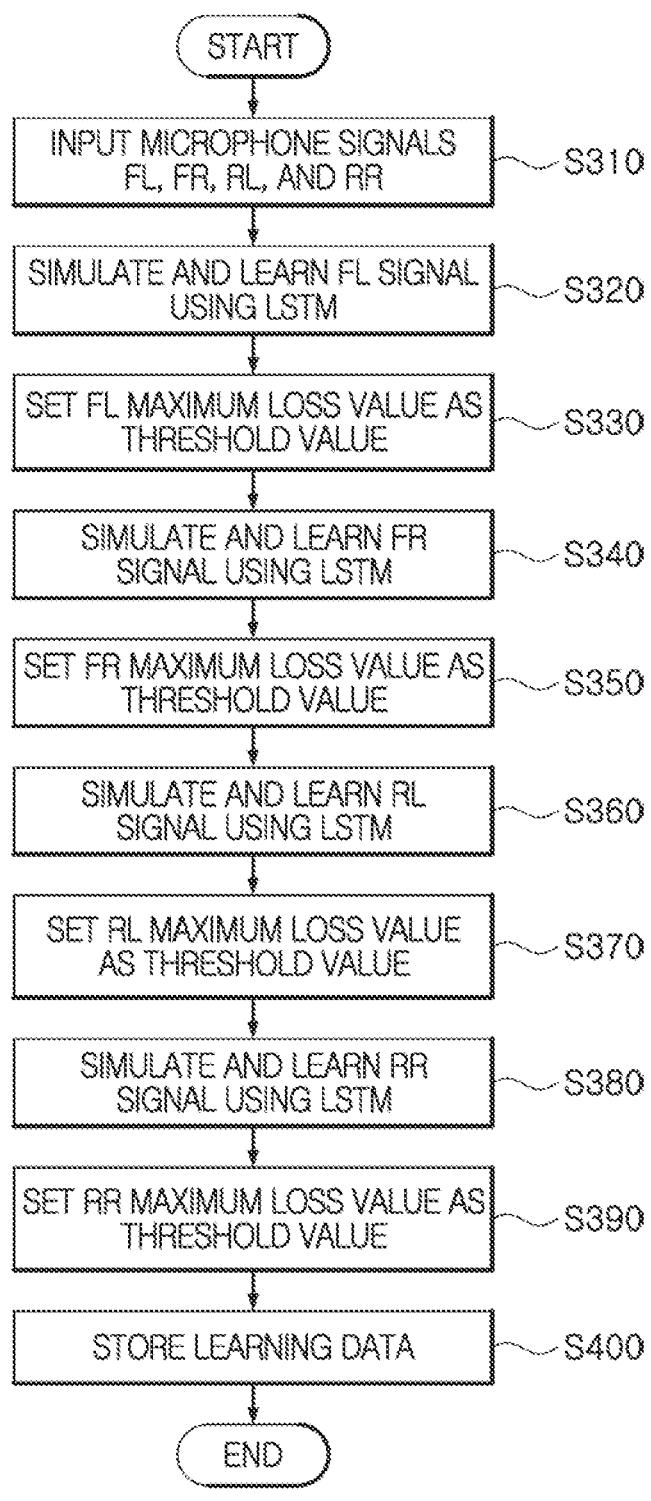
FIG. 6 is a flowchart illustrating a sound learning method of the apparatus for diagnosing a microphone of a vehicle according to one embodiment of the present invention.

FIG. 6 is a flowchart illustrating a sound learning method of the apparatus for diagnosing a microphone of a vehicle according to one embodiment of the present invention.

The processor 110 analyzes the sound collected through the microphone 30 to detect a road surface noise, generates a signal with an opposite phase for attenuating the road surface noise, and outputs the signal through the speaker 20 to reduce an interior noise.

When a failure occurs in at least one among the plurality of microphones 31 to 34, since an error occurs in reducing the road surface noise, the processor 110 analyzes sounds collected through the plurality of microphones 31 to 34 to detect a failure of the microphone.

When it is determined that any one among the microphones fails, the processor 110 outputs an error and stops the noise reduction function.

In order to detect a microphone failure, the processor 110 learns the sounds of the plurality of microphones and sets a threshold value, which is a failure criterion, as follows.

As shown in FIG. 6, the processor 110 receives the microphone signals FL, FR, RL, and RR from the plurality of microphones 31 to 34 (S310).

based on the microphone signals of the second microphone 32 to the fourth microphone 34 except for the first microphone 31, the processor 110 learns the microphone signal FL of the first microphone 31 using the LSTM auto encoder 160 and generates a simulated signal for the microphone signal FL of the first microphone 31 (S320).

The processor 110 compares the simulated signal with an actual microphone signal FL of the first microphone 31 through the loss function, assigns a weight based on an output loss value, and feeds the weight back to the LSTM auto encoder 160.

The processor 110 sets an FL maximum loss value as an FL threshold value by adding a predetermined margin to a maximum value of loss values output during the simulated signal generation and learning process (S330).

based on the microphone signals of the first microphone 31, the third microphone 33, and the fourth microphone 34 except for the second microphone 32, the processor 110 learns the microphone signal FR of the second microphone 32 using the LSTM auto encoder 160 and generates a simulated signal for the microphone signal FR of the first microphone 31 (S340).

The processor 110 compares the simulated signal with an actual microphone signal FR of the second microphone 32 through the loss function, assigns a weight based on an output loss value, and feeds the weight back to the LSTM auto encoder 160.

The processor 110 sets an FR maximum loss value as an FR threshold value by adding a predetermined margin to a maximum value of loss values output during the simulated signal generation and learning process (S350).

The processor 110 generates simulated signals through the same process for the third microphone 33 and the fourth microphone 34 and sets threshold values (S360 to S390).

The processor 110 stores simulated signal data through the learning and the threshold value for each microphone signal (S400).

Figure 7:
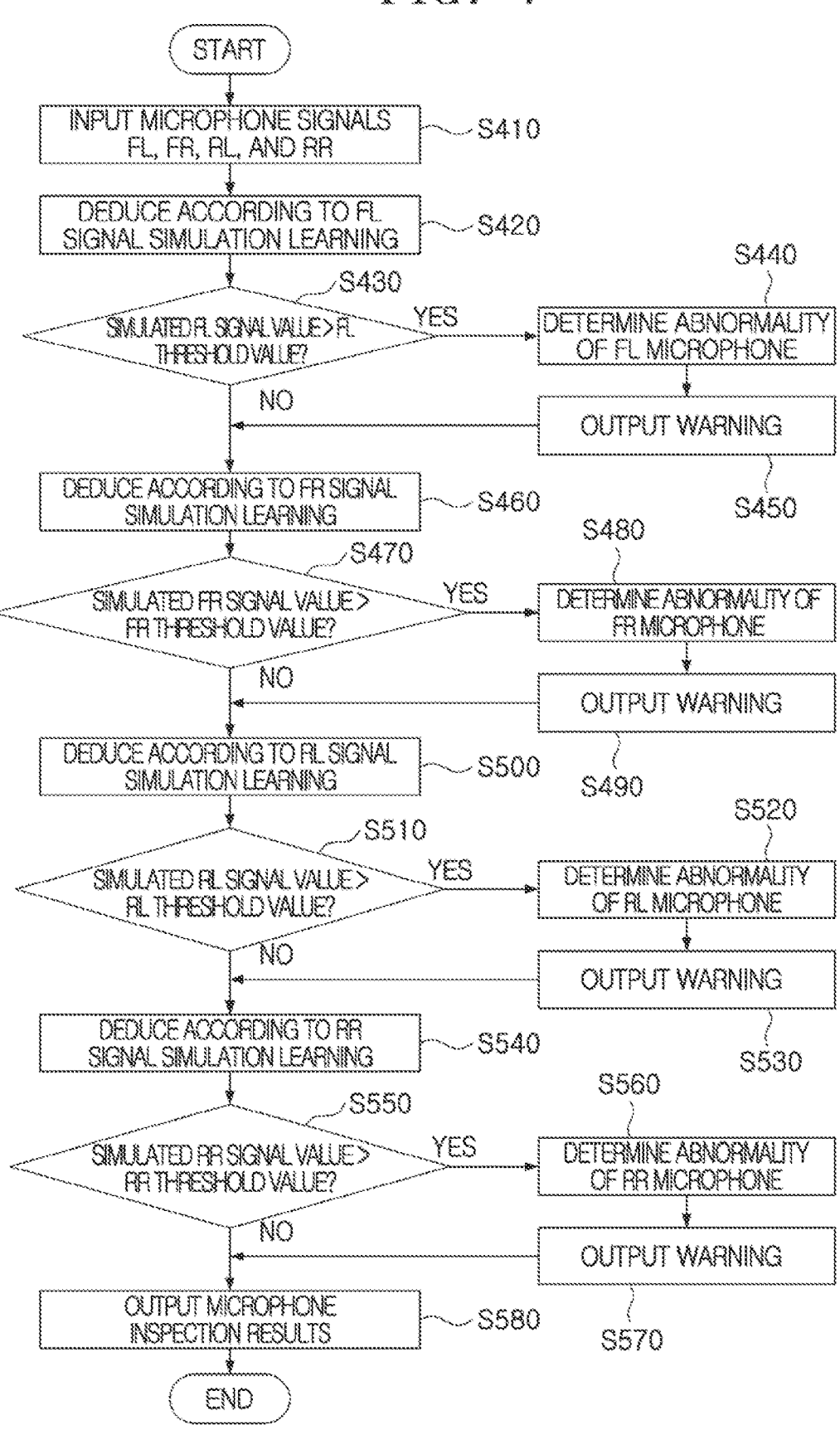
FIG. 7 is a flowchart illustrating a method of diagnosing a failure using a sound of the apparatus for diagnosing a microphone of a vehicle according to one embodiment of the present invention.

FIG. 7 is a flowchart illustrating a method of diagnosing a failure using a sound of the apparatus for diagnosing a microphone of a vehicle according to one embodiment of the present invention.

As shown in FIG. 7, the processor 110 receives the signals from the first microphone 31 to the fourth microphone 34

(S410), learns each microphone signal using the microphone signals FL, FR, and RL signals, and generates simulated signals.

The processor 110 simulates the FL signal of the first microphone using the LSTM auto encoder 160 based on the signals of the second microphone 32 to the fourth microphone 34 (S420), compares a loss value for the simulated FL signal value of the first microphone with a preset FL threshold value, and determines whether the loss value exceeds the FL threshold value (S430).

When the calculated signal loss value exceeds the FL threshold value, the processor 110 determines that abnormality occurs in the FL signal, that is, the first microphone 31 (S440) and generates and outputs a warning for the abnormality of the first microphone 31 (S450).

The processor 110 simulates the FR signal of the second microphone using the LSTM auto encoder 160 based on the signals of the first microphone 31, the third microphone 33, and the fourth microphone 34 (S460), compares a preset FR threshold value with a loss value for the simulated FR signal of the second microphone, and determines whether the loss value exceeds the FR threshold value (S470).

When the calculated signal loss value exceeds the FR threshold value, the processor 110 determines that abnormality occurs in the FR signal, that is, the second microphone 32 (S480) and generates and outputs a warning for the abnormality of the second microphone 32 (S490).

The processor 110 simulates the RL signal of the third microphone using the LSTM auto encoder 160 based on the signals of the first microphone 31, the second microphone 32, and the fourth microphone 34 (S500), compares a loss value for the simulated RL signal value of the third microphone with a preset RL threshold value, and determines whether the loss value exceeds the RL threshold value (S510).

When the calculated signal loss value exceeds the RL threshold value, the processor 110 determines that abnormality occurs in the RL signal, that is, the third microphone 33 (S520) and generates and outputs a warning for the abnormality of the third microphone 33 (S530).

The processor 110 simulates the RR signal of the fourth microphone using the LSTM auto encoder 160 based on the signals of the first microphone 31 to the third microphone 33 (S540), compares a loss value for the simulated RR signal value of the fourth microphone with a preset RR threshold value, and determines whether the loss value exceeds the RR threshold value (S550).

When the calculated signal loss value exceeds the RR threshold value, the processor 110 determines that abnormality occurs in the RR signal, that is, the fourth microphone 34 (S560) and generates and outputs a warning for the abnormality of the fourth microphone 34 (S570).

When at least one among the plurality of microphones 30 fails, the processor 110 stops the noise reduction function. The processor 110 outputs inspection results for the plurality of microphones 30 (S580).

Therefore, according to the present invention, when a noise occurs due to deterioration, a poor contact, and an object contact of a specific microphone among the plurality of microphones, by using the fact that other microphones do not generate noises, simulation accuracy can increase through simulation of a signal and optimization, and a failure of the specific microphone can be diagnosed through comparison with a threshold value.

In accordance with an apparatus and a method for diagnosing a microphone of a vehicle according to the present invention, an interior noise can be reduced by applying an active road surface noise reduction method, a simulated signal for a specific microphone can be generated by learning sounds collected using a plurality of microphones, and a failure of the specific microphone can be accurately detected by comparing the simulated signal with an actual sound of the specific microphone.

In addition, in accordance with the present invention, noise reduction efficiency can be improved by distinguishing a noise from an interior sound, the spread of an unnecessary noise can be prevented by diagnosing a failure of a specific microphone, and a more comfortable and stable interior environment can be provided to occupants.

While the present invention has been described with reference to the embodiments shown in the drawings, these embodiments are merely illustrative and it should be understood that various modifications and equivalent other embodiments can be derived by those skilled in the art based on the embodiments. Therefore, the true technical scope of the present invention should be determined by the appended claims.

What is claimed is:

1. An apparatus for diagnosing a microphone of a vehicle comprising (1) a plurality of microphones including a first microphone and (2) a plurality of speakers, the apparatus comprising:
   a processor; and
   a non-transitory computer-readable medium storing executable instructions which, when executed by the processor, cause the processor alone or in combination with other processors to control the apparatus to perform:
      processing a sound captured by each of the microphones to generate a digital signal from each of the microphones to provide a plurality of digital signals representing the sound;
      generating a simulated signal for the first microphone using a learning process based on the digital signals of the plurality of microphones excluding the digital signal of the first microphone;
      comparing a measured signal of the first microphone with the simulated signal to calculate a loss value of the first microphone; and
      determining, based on the calculated loss value, whether a failure has occurred to the first microphone.

2. The apparatus of claim 1, wherein, for detecting whether a failure has occurred to the first microphone, the instructions, when executed by the processor, further cause the processor alone or in combination with other processors to control the apparatus to perform:
   determining whether the calculated loss value of the first microphone exceeds a preset threshold value; and
   in response to determining that the calculated loss value of the first microphone exceeds the preset threshold value, diagnosing that the failure has occurred to the first microphone.

3. The apparatus of claim 2, wherein the instructions, when executed by the processor, further cause the processor alone or in combination with other processors to control the apparatus to perform:
   comparing the simulated signal for the first microphone with the measured signal of the first microphone through a loss function to calculate the loss value of the first microphone;
   optimizing, via a learning process, the loss value to calculate a plurality of loss values;

adding a predetermined margin to a maximum value among the plurality of loss values; and
   setting, based on the predetermined margin added to the maximum value, the threshold value for the first microphone.

4. The apparatus of claim 3, wherein, for generating the simulated signal for the first microphone, the instructions, when executed by the processor, further cause the processor alone or in combination with other processors to control the apparatus to perform generating, using a long short-term memory (LSTM) auto encoder, the simulated signal for the first microphone.

5. The apparatus of claim 4, wherein:
   the LSTM auto encoder includes a plurality of LSTM encoders and a plurality of LSTM decoders,
   each LSTM encoder is configured to extract and abstract a feature of a signal, and
   each LSTM decoder is configured to restore and actualize the signal.

6. The apparatus of claim 4, wherein, for optimizing the loss value, the instructions, when executed by the processor, further cause the processor alone or in combination with other processors to control the apparatus to perform feeding back a network weight to the LSTM auto encoder using stochastic gradient descent based on the loss value.

7. The apparatus of claim 1, wherein the instructions, when executed by the processor, further cause the processor alone or in combination with other processors to control the apparatus to perform:
   detecting whether a failure has occurred to the plurality of microphones; and
   in response to detecting that a failure has occurred to at least one of the plurality of microphones, stopping a noise reduction operation and outputting a warning for the microphone to which the failure has occurred.

8. The apparatus of claim 7, wherein the instructions, when executed by the processor, further cause the processor alone or in combination with other processors to control the apparatus to perform:
   analyzing the sounds captured by the plurality of microphones to classify a type and amplitude of each captured sound;
   detecting a road surface noise to generate an attenuation signal with a phase opposite to a phase of the road surface noise; and
   outputting the attenuation signal through the plurality of speakers to perform the noise reduction operation.

9. A method of diagnosing a microphone of a vehicle, the vehicle comprising (1) a plurality of microphones including a first microphone and (2) a plurality of speakers, the method comprising:
   processing a sound captured by each of the microphones to generate a digital signal from each of the microphones to provide a plurality of digital signals representing the sound;
   generating a simulated signal for the first microphone using a learning process based on the digital signals of the plurality of microphones excluding the digital signal of the first microphone;
   comparing a measured signal of the first microphone with the simulated signal to calculate a loss value of the first microphone; and
   determining, based on the calculated loss value, whether a failure has occurred to the first microphone.

10. The method of claim 9, wherein determining whether the failure has occurred to the first microphone comprises:

determining whether the loss value of the first microphone exceeds a preset threshold value; and in response to determining that the calculated loss value exceeds the preset threshold value, diagnosing that the failure has occurred to the first microphone.

11. The method of claim 9, wherein:

the plurality of microphones includes second, third and fourth microphones, and generating the simulated signal comprises generating the simulated signal based on signals of the second, third and fourth microphones.

12. The method of claim 11, wherein generating the simulated signal includes generating the simulated signal of the first microphone based on the signals of the second, third and fourth microphones using a long short-term memory (LSTM) auto encoder.

13. The method of claim 12, wherein:

the LSTM auto encoder includes a plurality of LSTM encoders and a plurality of LSTM decoders, and generating the simulated signal includes:

extracting and abstracting features of the signals using the plurality of LSTM encoders; and restoring and actualizing the signals using the plurality of LSTM decoders.

14. The method of claim 12, further comprising:

comparing the simulated signal of the first microphone with the measured signal of the first microphone through a loss function to calculate the loss value of the first microphone;

optimizing the loss value by feeding back a network weight to the LSTM auto encoder using stochastic gradient descent based on the loss value;

performing learning by repeating generating the simulated signal to the optimizing of the loss value; and setting a threshold value for the first microphone by adding a predetermined margin to a maximum value among a plurality of calculated loss values.

15. The method of claim 9, further comprising:

detecting whether a failure has occurred to the plurality of microphones; and in response to detecting that a failure has occurred to at least one of the plurality of microphones, performing (1) stopping a noise reduction operation, and (2) outputting a warning for the microphone to which the failure has occurred.

16. The apparatus of claim 1, wherein, for generating the simulated signal for the first microphone, the instructions, when executed by the processor, further cause the processor alone or in combination with other processors to control the apparatus to perform generating, using a long short-term memory (LSTM) auto encoder, the simulated signal for the first microphone.

17. The method of claim 9, wherein generating the simulated signal includes generating the simulated signal of the first microphone based on the signals of the plurality of microphones excluding the first microphone using a long short-term memory (LSTM) auto encoder.

18. The apparatus of claim 1, wherein the learning process is performed at a manufacturing stage of the vehicle.

19. The apparatus of claim 18, wherein learning data for the learning process is updated by repeating the learning process based on data collected during traveling of the vehicle.

20. The method of claim 9, wherein the learning process is performed at a manufacturing stage of the vehicle.

* * * * *